United States Patent
Guidi et al.

(10) Patent No.: US 7,680,611 B2
(45) Date of Patent: Mar. 16, 2010

(54) METHOD FOR DETECTING AND REPORTING OF FLUID IN DISTRIBUTION NETWORKS, PARTICULARLY IN CONDOMINIUM WATER OR GAS DISTRIBUTION NETWORKS, AND APPARATUS FOR PERFORMING THE METHOD

(75) Inventors: Riccardo Guidi, Pianoro (IT); Silvano Tedeschi, Bologna (IT)

(73) Assignee: BlueCo S.R.L., Casalecchio di Reno (IT)

(*) Notice: Subject to any disclaimer, the term of this patent is extended or adjusted under 35 U.S.C. 154(b) by 0 days.

(21) Appl. No.: 11/808,424

(22) Filed: Jun. 11, 2007

(65) Prior Publication Data

US 2007/0288200 A1     Dec. 13, 2007

(30) Foreign Application Priority Data

Jun. 13, 2006    (IT)    ............... BO2006A0463

(51) Int. Cl.
   *G01L 11/00*   (2006.01)
   *G01F 23/00*   (2006.01)
(52) U.S. Cl. ........................................ 702/51
(58) Field of Classification Search .............. 702/45, 702/50, 51, 100; 73/40, 40.7
See application file for complete search history.

(56) References Cited

U.S. PATENT DOCUMENTS

| | | | | |
|---|---|---|---|---|
| 5,272,646 | A  * | 12/1993 | Farmer | ............ 702/51 |
| 6,237,618 | B1  | 5/2001 | Kushner | |
| 7,194,893 | B2 * | 3/2007 | Cook et al. | ........ 73/40.5 R |
| 7,231,811 | B2 * | 6/2007 | Sagi et al. | ............ 73/40 |
| 2006/0114113 | A1* | 6/2006 | Yokosawa et al. | ...... 340/632 |

FOREIGN PATENT DOCUMENTS

| | | | |
|---|---|---|---|
| FR | 2 836 206 A | | 8/2003 |
| FR | 2 857 749 A | | 1/2005 |
| JP | 2002-017010 | * | 1/2002 |
| WO | 2005/008208 | * | 1/2005 |

OTHER PUBLICATIONS

English Translation of JP 2002-017010, Jan. 2002.*
English Abstract of FR 2836206, Aug. 2003.*

* cited by examiner

*Primary Examiner*—Michael P Nghiem
(74) *Attorney, Agent, or Firm*—Modiano & Associati; Albert Josif; Daniel J. O'Byrne

(57) ABSTRACT

A method for detecting and reporting fluid leaks in a distribution network, particularly in condominium water or gas distribution networks, the method providing the steps of: acquiring at a preset rate statistical samples related to the extent of the water flow in input to the network; acquiring a variation coefficient which indicates the characteristics of the samples over a set time interval; comparing the variation coefficient with a preset reference value to identify a situation of fluid leak or of normality within the network; reporting the situation to monitoring devices.

11 Claims, 1 Drawing Sheet

METHOD FOR DETECTING AND REPORTING OF FLUID IN DISTRIBUTION NETWORKS, PARTICULARLY IN CONDOMINIUM WATER OR GAS DISTRIBUTION NETWORKS, AND APPARATUS FOR PERFORMING THE METHOD

The present invention relates to a method for detecting and reporting leaks of fluid in distribution networks, particularly in condominium water or gas distribution networks, and to an apparatus for performing the method.

BACKGROUND OF THE INVENTION

As is known, water distribution networks, due both to the aging of the pipes and systems and due to faults caused by accidents of various kinds, are subject to water leaks which can be frequent and more or less substantial.

In particular in the case of civil buildings, water leaks are particularly onerous, not only from an economic standpoint due to the waste entailed by such leaks but also because by being often hard to detect they can cause the onset of damage to adjacent buildings and dwellings and affect, in the most severe cases, both the structures of the buildings (for example the foundations) and the infrastructures (for example, courtyard paving, road paving, footpaths, et cetera).

The damage caused by water leaks, in addition to the damage mentioned above, involves another aspect which is certainly not secondary, i.e., the ethical one. The leaks of water distribution systems in fact waste an enormous amount of water, i.e., of a resource of primary importance which is not renewable and for which the need for active protection is ever more clearly felt at all levels.

The problem of water leaks is even more severe in cases in which dwellings are left unattended for long periods, when due to the lack of constant and frequent monitoring the abnormal consumption of water is detected when the harmful effects have already become apparent.

Water leaks are currently detected rather empirically by making a comparison between normal consumption of the user and a consumption which is believed to be abnormal. In this regard, it should be noted that for example condominiums usually have a single connection to the public water distribution network and the total withdrawal of water (i.e., the amount consumed by the dwellings) is quantified by a meter which is installed at the entrance of the supply.

If indication devices are not provided, any leaks are diagnosed by comparing water consumptions between two billing periods.

It is evident that if the consumption comparison times are widely spaced, the accumulated economic damage can be substantial.

Similar drawbacks are observed in gas distribution networks, with the addition of the danger of explosions.

SUMMARY OF THE INVENTION

The aim of the present invention is to provide a method which allows to diagnose the occurrence of water leaks in a much shorter time than required with current procedures, so as to reduce material and economic consequences.

Within this aim, an object of the present invention is to provide a method which is highly reliable in operation and in particular is insensitive to inappropriate physical parameters such as for example temperature variations of the water flow.

Another object of the present invention is to provide an apparatus which is easy to install in any civil and industrial distribution system and is capable of providing correct reporting of consumption anomalies to the personnel assigned to monitoring the water or gas network.

This aim and these and other objects which will become better apparent hereinafter are achieved with a method and an apparatus for performing the method whose characteristics are defined in the appended claims.

BRIEF DESCRIPTION OF THE DRAWINGS

Further characteristics and advantages of the invention will become better apparent from the following detailed description of an embodiment thereof, illustrated by way of non-limiting example in the accompanying drawings, wherein.

DESCRIPTION OF THE PREFERRED EMBODIMENTS

Figure 1:
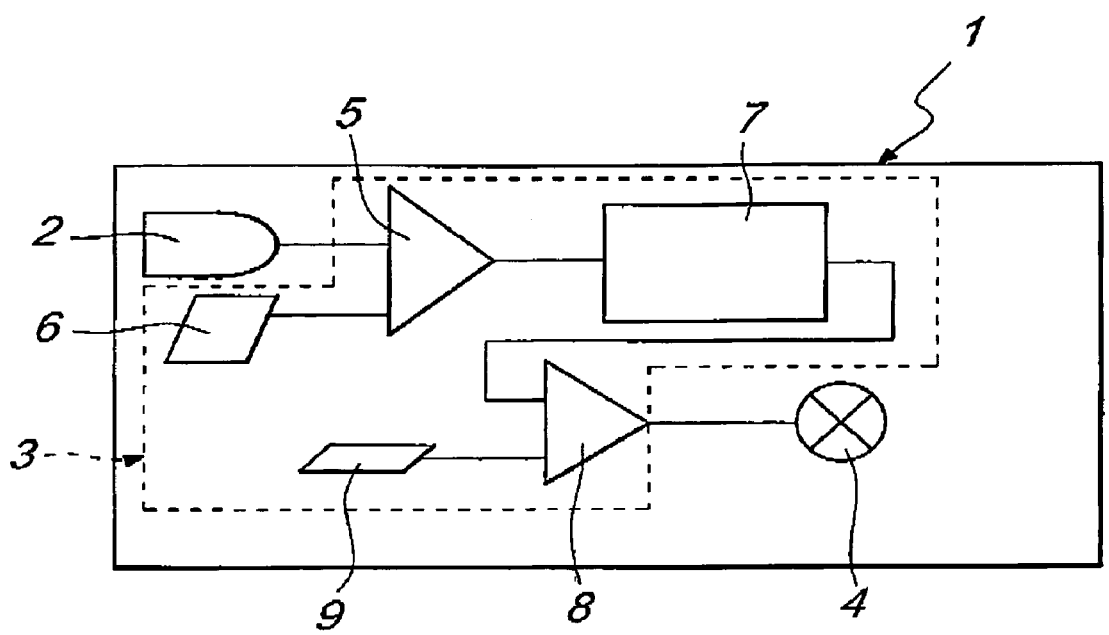
FIG. 1 is a block diagram of an apparatus provided with a computer according to a first version for processing the values detected at the input of a water distribution network.

In the accompanying FIG. 1, the reference numeral 1 designates a diagram of an apparatus for detecting and reporting water leaks in a condominium water distribution network.

The apparatus 1 is composed substantially of three assemblies which are functionally mutually associated, and specifically: sample acquisition means, such as a flow transducer 2, a processing unit or computer 3, and an indicator or reporting means, such as a reporting device 4.

The transducer 2 is conveniently preset to sample the flow, i.e., acquire samples of the extent or quantity of the flow at each instant. Advantageously, the acquisition rate of such samples is for example approximately 1 second, in order to avoid delays in detecting variations in the water flow.

The signal processed by the transducer 2 is sent to the computer 3. The characteristics of the signal are correlated to the consumption habits of the user and to any consumption caused by water leaks. Therefore, in normal operating conditions (i.e., in the absence of water leaks), high flow differences occur during the day.

The computer 3 comprises a coefficient acquisition means constituted by a threshold comparator 5, which detects whether the samples of flow acquired by the transducer 2 have a value which is higher or lower than a preset threshold value, which is contained in a memory 6 and indicates the minimum extent of the water leak that the apparatus is capable of detecting.

The comparator 5 is connected to a detection unit which is constituted for example by an incremental counter 7, which counts the number of consecutive times for which the comparator 5 has detected the presence of a water flow which exceeds the preset threshold value. Every time a flow sample detected by the transducer 2 has a value which is lower than the threshold valve of the memory 6, the counter 7 is reset.

Vice versa, the number of consecutive samples of flow exceeding the threshold value of the memory 6 is totaled by the incremental counter 7 and sent to a comparison means constituted, for example, by a second comparator 8 and compared with a preset reference numeral, which is stored in the memory 9, and the result indicates an abnormal flow situation.

If this comparison shows that the reference numeral stored in the memory 9 is smaller than the numeral at the output of the counter 7, the comparator 8 recognizes this situation as abnormal and due to a water leak. In this case, the leak is reported appropriately by reporting means, such as the reporting device 4, to the personnel assigned to monitoring. This may be carried out, for example by sending signals by means of a transmission (reporting) device constituted by a GSM modem or other suitable known transmission devices.

As can be seen, the described invention perfectly achieves the intended aim and objects. The important advantage of the proposed solution lies in that any malfunctions in the water network can be diagnosed more rapidly than with traditional empirical methods.

Further, diagnosis of any malfunctions by statistical identification of the abnormal flow caused by water leaks has the considerable advantage of requiring the use of a single flow transducer and therefore of having cheaper material and installation costs than traditional systems which, for example in a condominium, entail a comparison between the incoming flow and the sum of the outgoing flows.

The flow and count threshold values stored in the memories 6 and 9 are characteristic values of the installation site and are correlated respectively to the extent of the minimum flow of a leak which can be recognized by the device and to the maximum time within which said leak will be recognized.

However, it is possible to use a plurality of processing units such as the one described which work in parallel but have different pairs of threshold and count values; this is done in order to recognize substantial leaks in a shorter time and more modest leaks over longer time periods.

In practice, the method according to the invention and the apparatus for performing it are susceptible of numerous modifications and variations, all of which are within the scope of the appended claims.

Figure 2:
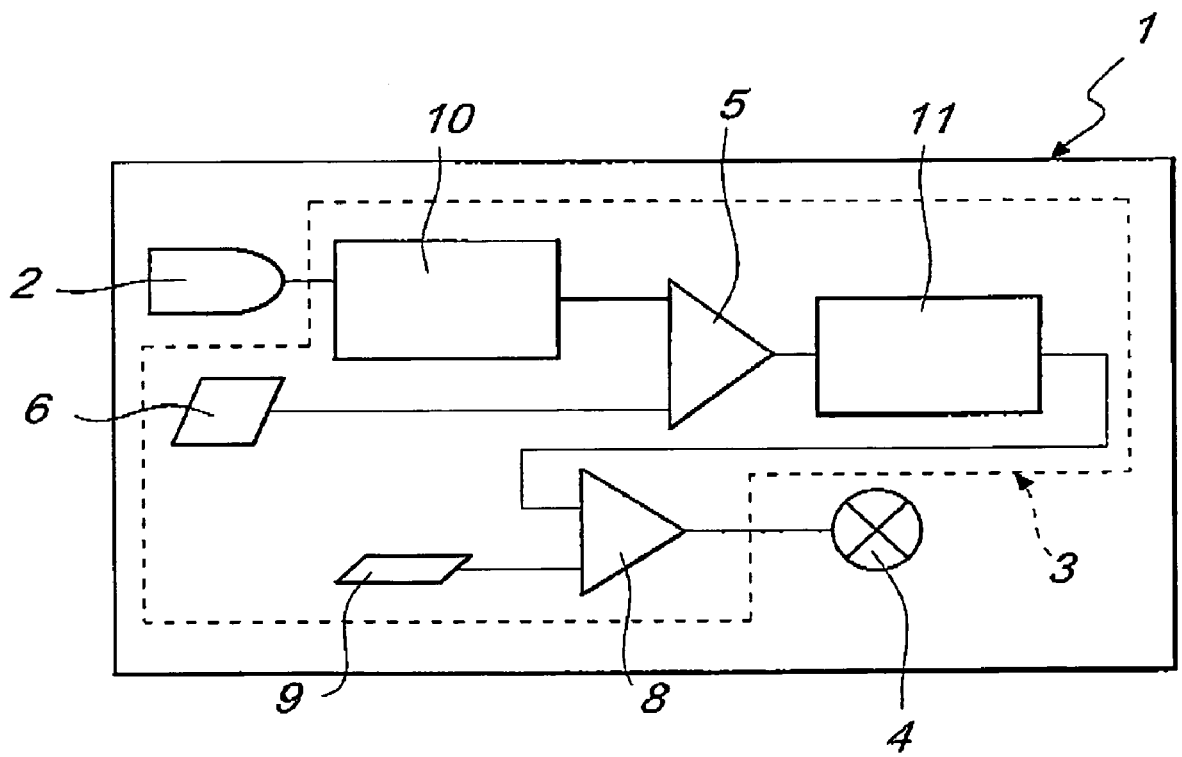
FIG. 2 is a block diagram of an apparatus provided with a further version of the computer.

FIG. 2 illustrates a solution in which the computer 3 is preset for a statistical analysis of the sampled flow values by using the deviation, understood as the difference between a value assumed by the variable flow and a fixed value of the flow. Conveniently, a mean value is taken as a fixed value, and in order to have a measurement of the scatter of the flow variation around the mean value, the variance or mean square deviation $s(x)$ is considered, defined as a weighted square mean of the deviations from the arithmetic mean $M(x)$, which substantially expresses the error that is made by assuming the mean value instead of the detected values. From what has been described it is evident that if a normal flow is assumed, the mean square deviation $s(x)$ will reach higher values, while the mean $M(x)$ will remain at low values.

In the presence of a water leak characterized by a slow flow variation, i.e., extended over time, the mean square deviation $s(x)$ will instead tend to zero, while the mean value $M(x)$ will be high.

The computer 3 therefore comprises a module 10 (FIG. 2) in which the variation coefficient $d(x)$ is calculated, said coefficient being understood as the ratio between the mean square deviation $s(x)$ and the mean $M(x)$, acquired over a preset time interval. The comparator 5 then compares the variation coefficient $d(x)$ with a reference value which is stored in the memory 6 and is determined, as mentioned, in relation to the characteristics of the installation site of the transducer or by means of a self-learning step.

The output of the comparator 5 is connected to a detection unit 11, which is constituted by a timer which measures the time interval within which the output of the comparator 5 identifies a value of the variation coefficient $d(x)$ which is lower than the reference value of the memory 6. The second comparator 8 checks that the time interval measured by the timer does not exceed a preset value, and if this occurs, its output activates the reporting device 4.

A simplified method is based on the consideration that for a typical behavior of a normal flow, i.e., without water leaks, since the variation coefficient $d(x)$ is normally higher than the mean value $M(x)$, the likelihood that the value of the flow will drop to zero or in any case below the minimum threshold value of the leak that one is interested in identifying, over a sufficiently long period of observation, is high. On the contrary, in the presence of a leak the value of flow will never drop below this value.

The method is characterized in this case by the presence of a timer which sets a time within which the identification of the condition of the flow below a preset threshold value must occur, so that if the transducer determines that there is a condition of a lower flow within the preset time, the timer is reset and the absence of leaks is ascertained. If instead the intended time elapses without failure of the threshold condition, the abnormal situation which can be traced back to a leak is identified and therefore reported by means of a GSM (Global System for Mobile communications) modem or other monitoring device to the monitoring personnel.

It should be noted that the described method can be applied similarly for detecting gas leaks.

The disclosures in Italian Patent Application No. BO2006A000463 from which this application claims priority are incorporated herein by reference.

What is claimed is:

1. A method for detecting and reporting fluid leaks in a condominium water or gas distribution network, comprising the steps of:

acquiring, by means for acquiring samples, at a preset rate statistical samples related to a quantity of a fluid flow in input to the network;

acquiring, by means for acquiring coefficients, a variation coefficient which indicates characteristics of said samples over a set time interval;

comparing, by means for comparing, said coefficient with a preset reference value to identify a situation of fluid leak or of normality within said network;

reporting, by means for reporting, said situation to monitoring devices, wherein said variation coefficient corresponds to a number of samples detected consecutively above a preset threshold value, so that if a result of a comparison is higher than the reference value, a situation is recognized as abnormal and due to a fluid leak.

2. The method of claim 1, wherein said variation coefficient corresponds to a ratio between the mean square deviation $s(x)$ and the mean $M(x)$ of values of the fluid flow acquired over a preset time interval from the quantity of the fluid flow, so that if a result of the comparison is lower than the reference value, a situation is recognized as abnormal and due to a fluid leak.

3. The method of claim 2, wherein said comparison is determined in relation to characteristics of a site of acquisition of the statistical samples or by way of a self-learning step.

4. The method of claim 1, wherein said means for reporting comprise a transmission apparatus.

5. An apparatus for detecting and reporting fluid leaks in a condominium water or gas distribution network, according to the method of claim 1, comprising:

the means for acquiring samples for acquiring at a preset rate statistical samples related to the extent of the water or gas flow in input in said network;

the means for acquiring coefficients for acquiring a variation coefficient which indicates characteristics of said samples over a set time interval;

the means for comparing, for comparing said coefficient with a preset reference value to identity a situation of water or gas leak or of normality within said network;

the means for reporting, for reporting said situation to monitoring devices, wherein said sample acquisition means for acquiring at a preset rate statistical samples related to a quantity of water or gas flow in input to said network are constituted by a flow transducer which is arranged at an input of said network, and wherein said coefficient acquisition means for acquiring said variation coefficient is suitable to detect a number of samples detected consecutively above a preset threshold value.

6. The apparatus of claim 5, wherein said means for comparing comprise a first threshold comparator, which is suitable to detect a number of samples acquired by said flow transducer and to compare them with a threshold value of a first memory, a detection unit which is connected to an output of said first comparator and is suitable to provide an output which gives an indication of the flow detected by said transducer and a second comparator which is suitable to compare said output with a preset threshold value of a second memory, means for reporting being further provided as a reporting device that is connected to the output of said second comparator and is suitable to provide a signal in case of an abnormal flow situation.

7. The apparatus of claim 6, comprising a module for calculating said variation coefficient that is arranged between said flow transducer and said first comparator.

8. A method for detecting and reporting fluid leaks in a condominium water or gas distribution network, comprising the steps of acquiring, by means for acquiring samples, at a preset rate statistical samples related to a quantity of a fluid flow in input to the network;

acquiring, by means for acquiring coefficients, a variation coefficient which indicates characteristics of said samples over a set time interval;

comparing, by means for comparing, said coefficient with a preset reference value to identity a situation of fluid leak or of normality within said network;

reporting, by means for reporting, said situation to monitoring devices, wherein said variation coefficient corresponds to a ratio between the mean square deviation $s(x)$ and the mean $M(x)$ of values of the fluid flow acquired over a preset time interval from the quantity of the fluid flow, so that if a result of the comparison is lower than the reference value, a situation is recognized as abnormal and due to a fluid leak.

9. The method of claim 8, wherein said variation coefficient corresponds to a number of samples detected consecutively above a preset threshold value, so that if a result of a comparison is higher than the reference value, a situation is recognized as abnormal and due to a fluid leak.

10. The method of claim 9, wherein said comparison is determined in relation to characteristics of a site of acquisition of the statistical samples or by way of a self-learning step.

11. The method of claim 8, wherein said means for reporting comprise a transmission apparatus.

\* \* \* \* \*

UNITED STATES PATENT AND TRADEMARK OFFICE
CERTIFICATE OF CORRECTION

PATENT NO. : 7,680,611 B2 Page 1 of 1
APPLICATION NO. : 11/808424
DATED : March 16, 2010
INVENTOR(S) : Riccardo Guidi and Silvano Tedeschi It is certified that error appears in the above-identified patent and that said Letters Patent is hereby corrected as shown below:

On the title page item (73) should read:
Blueco S.r.l., Casalecchio di Reno
(IT)

Signed and Sealed this

Twenty-second Day of June, 2010

David J. Kappos
*Director of the United States Patent and Trademark Office*